2 Sheets—Sheet 1.

R. F. SHINN.
GRAIN SEPARATOR.

No. 179,821. Patented July 11, 1876.

WITNESSES
Henry V. Miller
C. L. Ewest

INVENTOR
Robert F. Shinn.
By Alexander Mason,
Attorneys

2 Sheets—Sheet 2.

R. F. SHINN.
GRAIN SEPARATOR.

No. 179,821. Patented July 11, 1876.

WITNESSES
Henry N. Miller
C. L. Ewert

INVENTOR
Robert F. Shinn
Alexander Mason
By Attorneys

UNITED STATES PATENT OFFICE.

ROBERT F. SHINN, OF SHERIDAN, ILLINOIS.

IMPROVEMENT IN GRAIN-SEPARATORS.

Specification forming part of Letters Patent No. 179,821, dated July 11, 1876; application filed January 21, 1876.

*To all whom it may concern:*

Be it known that I, R. F. SHINN, of Sheridan, in the county of La Salle, and in the State of Illinois, have invented certain new and useful Improvements in Grain-Separators; and do hereby declare that the following is a full, clear, and exact description thereof, reference being had to the accompanying drawings, and to the letters of reference marked thereon, making a part of this specification.

My invention relates to grain-separators for separating or cleaning all kinds of grain and seeds; and it consists, first, in a device for adjusting the feed-slides of the hopper, and for indicating said adjustment by a graduated scale; second, in devices for producing and regulating the motion of the sieve-frame, or shoe to which the sieves are attached, so as to drive the grain or seed, with their foul admixtures, from the hopper to, on, through, or over the sieves; third, in devices for directing and controlling the blast of the fans, so as to adapt the machine to the greatest variety of work, and develop its utmost capacity; fourth, in devices for producing, regulating, and modifying the motion of the discharging-screen, so as to prevent it from clogging, and to thoroughly sift the grain or seed on which the operation is performed, as will be hereinafter more fully set forth.

In order to enable others skilled in the art to which my invention appertains to make and use the same, I will now proceed to describe its construction and operation, referring to the annexed drawings, in which—

Figure 1:
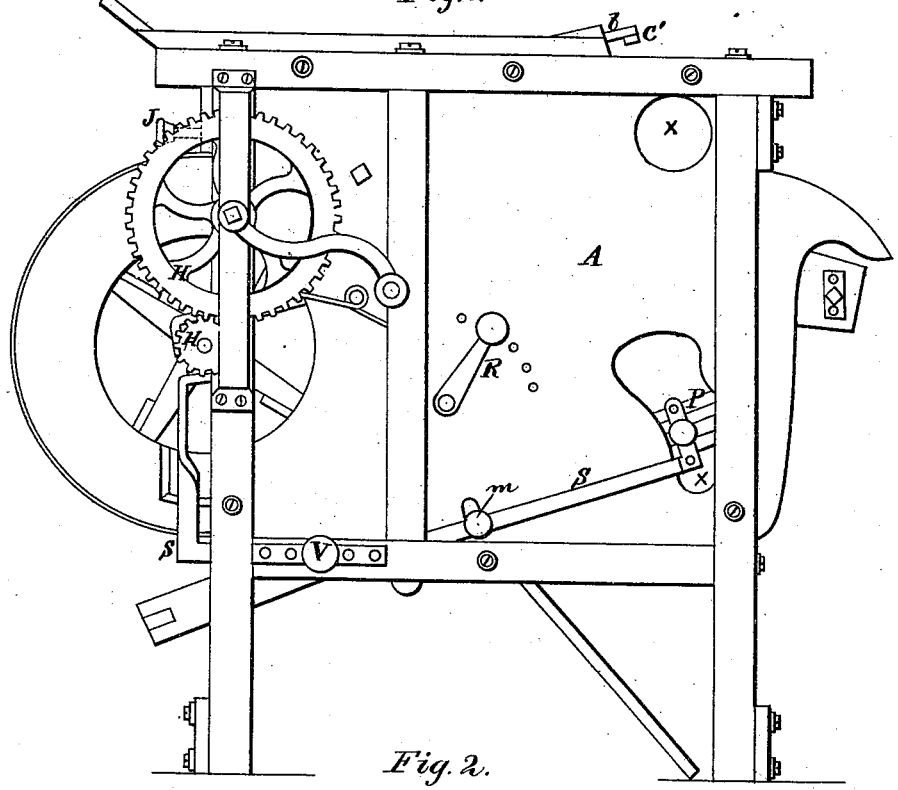
Figure 2:
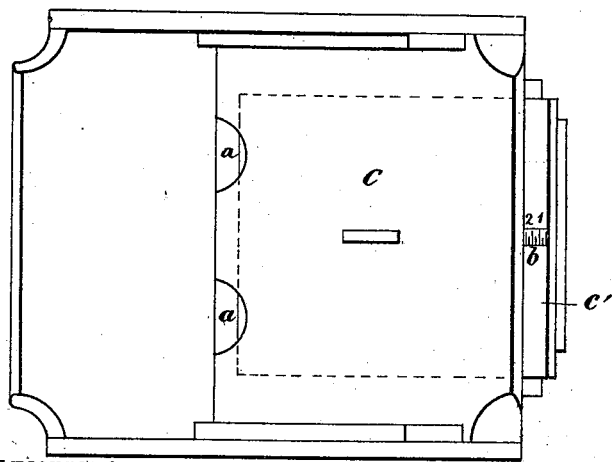
Figure 3:
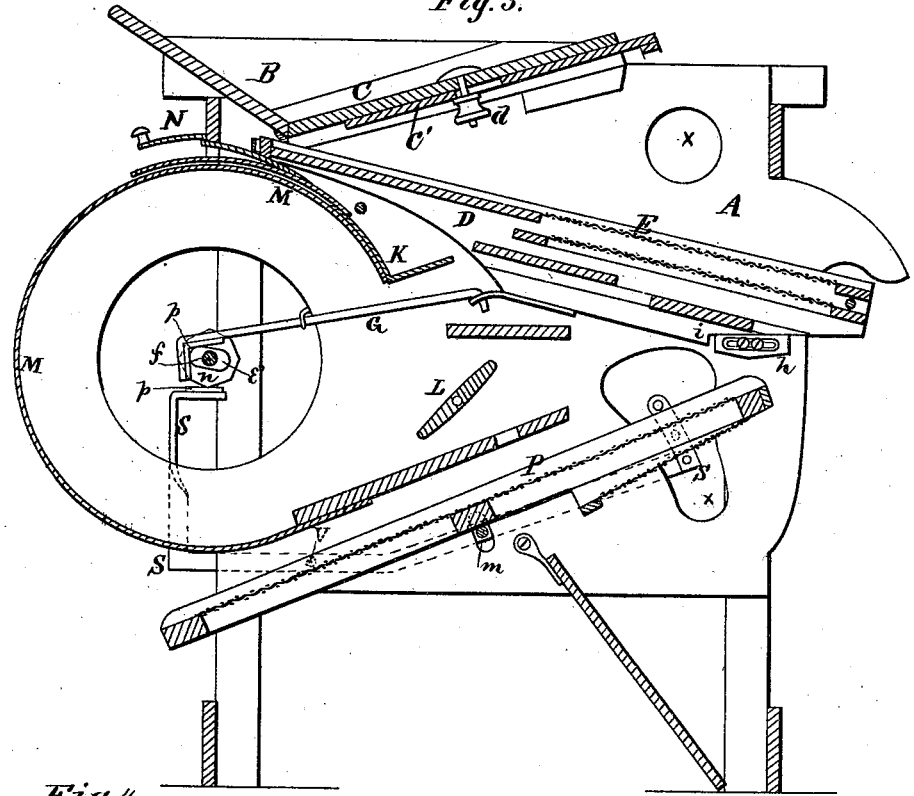
Figure 4:
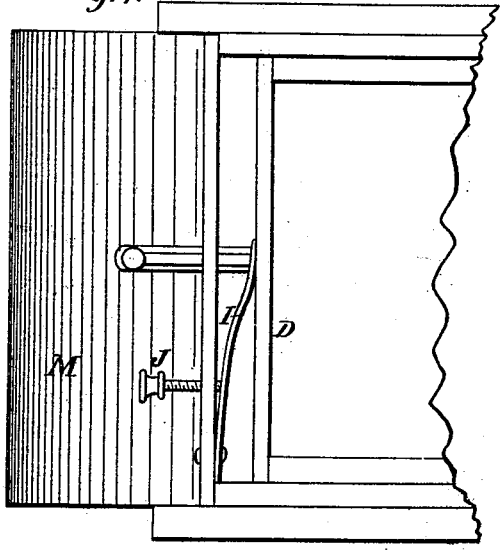

Figure 1 is a side elevation of a grain-separator embodying my invention. Fig. 2 is a plan view of the hopper. Fig. 3 is a longitudinal vertical section of the machine. Fig. 4 is a plan view, showing the upper end of the sieve-frame or shoe.

A represents the frame-work of a grain-separator, with hopper B on top. Attached to this hopper, and forming a part thereof, are the two adjustable slides C C', the latter sliding in ways or guides under the former. In the lower edge of the top slide C are openings $a$ $a$, which are regulated by the lower slide C'. On this lower slide is a graduated scale, $b$, the graduations of which become visible to the operator above the margin of the upper slide C, as the lower slide is drawn out by the hand of the operator, and thus enlarging the apertures $a$, through which the grain, seed, &c., pass out of the hopper to the sieves below. The lower slide C' is held in any desired position (indicated on said scale $b$) by the operator turning a thumb-screw, $d$, underneath, and thus securing the slide in the desired position for properly gaging the grain or seed in their passage from the hopper to the sieves, which adjustment the operator can thus make while running his machine, and by which he may readily avail himself of the full capacity of the machine in any specific operation.

D represents the sieve-frame or shoe, in which the sieves E E are placed. To the lower rear edges of the shoe D are attached connecting-arms G G, which extend rearward, and have their rear ends bent downward over and in contact with elliptic cams $e$ $e$, attached to the fan-shaft $f$. These cams revolve with said shaft, as the same is driven by the wheel-gear H H, thus giving a rapid longitudinal or end motion to the sieve-frame or shoe D backward, which propels said shoe against a regulating-spring, I, at its upper end. This regulating-spring, in turn, throws the shoe longitudinally forward with more or less violence, as determined and regulated by the thumb-screw J, connected to said spring; and by the lower margins of the shoe D being constructed with shoulders $i$, so as to strike adjustable bumpers $h$, attached to the sides of the frame A, a sudden percussion blow is produced, whereby the movement of the contents of the sieves E on, to, or over said sieves is greatly facilitated. The force of this blow is also determined by the regulating-spring I, by the thumb-screw J, adjusted by the operator while the operation is progressing. K and L are two adjustable wind-gages, which are employed in connection with the blast of the fan on the sieves and their contents, and also in connection with each other. The wind-gage K slides over the top of the fan-case M, and is adjusted by means of a rod, N, attached to it, as shown in Fig. 3. The wind-gage L turns upon pivots, and is adjusted by means of a spring-lever, R, having a pin entering indentations in the side of the frame.

In chaffing, and in expelling very light materials or refuse from the sieves E, it will often be found necessary to elevate the wind-gage K by drawing out the rod N, and thus turning a portion of the blast on the contents of the sieves E, so as to effectually expel the refuse therefrom, the force of the blast thus directed being determined, as the operator may find needful, by the degree of said elevation of the wind-gage K, and the relative position of the wind-gage L, both of which he can easily adjust so as to best suit his purposes while proceeding with the operation. Thus the variety and speed of his operations are increased, and the sieves rendered more efficient. P represents the discharge-screen, adjustably attached to the front ends of the bent levers S S, and supported by a rod, m, connecting the same. The levers S are supported and adjusted by the adjustable fulcrums V, the rear ends of said levers being bent upward, and pressing against the polygonal cams n, secured upon the fan-shaft h, in consequence of their greater weight being at the front end opposite to that of the place of their contact with the cams, thus causing a rapid tremulous vibrating and reciprocating motion of the levers S, and of the discharging-screen P attached thereto, whereby the clogging of said screen is most effectually prevented, and the grain compelled to pass quickly through or over it, whatever the character or condition of the materials operated upon.

The great utility of this operation is obvious, also of the devices by which it is performed, especially of the adjustable fulcrums V, as any change of their position, either nearer to or farther from the power or place of contact of the levers S with the polygonal cams n, by which they are operated, causes a corresponding variation of the motion of the discharging-screen by means of said levers, whereby the operator is enabled to adapt the motion of said discharging-screen to the demands of any specific operation, thus adding greatly to the value and importance of its application to the purposes of the machine and operator.

On the ends of the levers S, as well as on the ends of the arms G, are fastened anti-friction strips p, of leather, rawhide, or other non-metallic substance, to prevent their friction against their respective cams, and thereby preventing noise and wear on each other.

W represents the sand-board used in cleaning certain grains and seeds in connection with the double discharging-screen, as occasion may require, or it may be omitted, at the option of the operator.

When the sides of the machine are fully inclosed, as shown in the drawing, windows x x are made therein, so that the operator may see the progress of the operation, and readily detect and correct any defects therein.

Having thus fully described my invention, what I claim as new, and desire to secure by Letters Patent, is—

1. The combination, with the sieve-frame or shoe D, of the connecting-arms G, elliptic cams n on the fan-shaft h, and the spring I, all constructed substantially as and for the purposes herein set forth.

2. The adjustable bumpers h, in combination with the sieve-frame or shoe D, having shoulders i, and the spring I, substantially as and for the purposes herein set forth.

3. The combination of the discharging-screen P, having adjustable fulcrums V, levers S, and polygonal cams n, substantially as and for the purposes herein set forth.

In testimony that I claim the foregoing I have hereunto set my hand and seal this 25th day of December, 1875.

ROBERT F. SHINN. [L. S.]

Witnesses:
SAML. M. ROWE,
DELOS ROBINSON.